US011014476B2

(12) United States Patent
Allmann (10) Patent No.: US 11,014,476 B2
(45) Date of Patent: May 25, 2021

(54) SEAT AND UTILITY VEHICLE

(71) Applicant: Rheinmetall MAN Military Vehicles Österreich GesmbH, Vienna (AT)

(72) Inventor: Christian Allmann, Vienna (AT)

( * ) Notice: Subject to any disclaimer, the term of this patent is extended or adjusted under 35 U.S.C. 154(b) by 0 days.

(21) Appl. No.: 16/619,568

(22) PCT Filed: Oct. 30, 2018

(86) PCT No.: PCT/EP2018/079658
§ 371 (c)(1),
(2) Date: Dec. 5, 2019

(87) PCT Pub. No.: WO2019/201462
PCT Pub. Date: Oct. 24, 2019

(65) Prior Publication Data
US 2020/0164777 A1     May 28, 2020

(30) Foreign Application Priority Data

Apr. 17, 2018    (DE) .......................... 102018109130.3

(51) Int. Cl.
*B60N 2/32*     (2006.01)
*B60N 2/38*     (2006.01)

(52) U.S. Cl.
CPC ....... *B60N 2/32* (2013.01); *B60N 2/38* (2013.01)

(58) Field of Classification Search
CPC .. B60N 2/32; B60N 2/38; A47C 13/00; A47C 12/02

(Continued)

(56) References Cited

U.S. PATENT DOCUMENTS

| 7,093,899 B2 | 8/2006 | Fisher et al. |
| 8,091,957 B2 * | 1/2012 | Allmann ................. B60R 7/043 |
| | | 297/129 |

(Continued)

FOREIGN PATENT DOCUMENTS

| DE | 19820880 C1 | 3/2000 |
| DE | 20110630 U1 | 12/2002 |

(Continued)

OTHER PUBLICATIONS

IP Australia, Office Action Issued in Application No. 2018412624, dated May 28, 2020, Australia, 4 Pages.

(Continued)

*Primary Examiner* — Mark R Wendell
(74) *Attorney, Agent, or Firm* — Alleman Hall Creasman & Tuttle LLP (57) ABSTRACT

A seat for a utility vehicle, in particular for a military utility vehicle, comprising a seat base, a seat element comprising a sitting surface and a first stepping surface, a first pivoting mechanism for pivoting the seat element such that the seat element is pivotable from a seat position, in which the first stepping surface is facing the seat base, into a first step position, in which the first stepping surface is facing away from the seat base, a backrest comprising a backrest sitting surface and a second stepping surface, and a second pivoting mechanism for pivoting the backrest such that the backrest is pivotable from a seat position, in which the backrest sitting surface is positioned upright relative to the seat base, into a second step position, in which the second stepping surface is arranged parallel to the first stepping surface.

16 Claims, 7 Drawing Sheets

(58) Field of Classification Search
USPC .......................... 297/118, 311, 331, 332, 333
See application file for complete search history.

(56) References Cited

U.S. PATENT DOCUMENTS

2015/0197919 A1* 7/2015 Ortega ..................... B60N 2/38
                                                      297/313
2018/0215319 A1* 8/2018 Line .......................... B60N 2/22

FOREIGN PATENT DOCUMENTS

| DE | 102009038440 A1 | 3/2011 |
| DE | 102012012505 A1 | 1/2013 |
| EP | 1832468 A2 | 9/2007 |
| EP | 3002541 A1 | 4/2016 |
| RU | 48890 U1 | 11/2005 |

OTHER PUBLICATIONS

Federal Service for Intellectual Property, Office Action Issued in Application No. 2019127541, dated May 25, 2020, 13 pages.
Intellectual Property India, Office Action Issued in Application No. 201917030051, dated Dec. 16, 2020, 6 pages.

* cited by examiner

SEAT AND UTILITY VEHICLE

FIELD

The present invention relates to a seat for a utility vehicle and a utility vehicle comprising such a seat.

BACKGROUND

In utility vehicles, in particular in trucks, for military applications usually a center seat is provided between a driver's seat and a front passenger's seat arranged in a cab. The center seat is intended to enable the operation of a weapon mounted on or to the roof via a roof hatch provided on the cab. For this, it is necessary to provide a stepping surface on the center seat.

EP 1 832 468 shows a seat, in particular of a truck, padded on a top surface, having a pivoting rotating mechanism by means of which the seat can be forced into a position where the top surface is facing downward and is accessible for at least one additional use.

EP 3 002 541 A1 describes a seat for a vehicle having a back rest and a sitting surface, the seat comprising a hinged tray articulated in relation to the back rest, the tray being positionable in a folded position in a receptacle of the backrest at a front face of the latter, which is designed to receive the back of a user sitting on the seat, the seat comprising armrests on which the tray is supported in a folded-apart position.

SUMMARY

Against this background, it is an object of the present invention to provide an improved seat for a utility vehicle.

Accordingly, a seat for a utility vehicle, in particular a military utility vehicle, is proposed. The seat comprises a seat base, a seat element comprising a sitting surface and a first stepping surface, a first pivoting mechanism for pivoting the seat element such that the seat element is pivotable from a seat position in which the first stepping surface is facing the seat base into a first stepping position in which the first stepping surface is facing away from the seat base, a backrest comprising a backrest sitting surface and a second stepping surface, and a second pivoting mechanism for pivoting the backrest such that the backrest is pivotable from a seat position in which the backrest sitting surface is positioned upright relative to the seat base into a second step position in which the second stepping surface is arranged parallel to the first stepping surface.

By providing a first stepping surface and a second stepping surface, two standing heights may be realized compared to known seats for utility vehicles, with the first stepping surface being operable as step-up aid to the second stepping surface. This allows for two standing levels to be achieved, wherein, for example, users of most diverse body sizes are able to use the seat, or the user is able to see more or less far out of a roof hatch of the utility vehicle depending on the stepping surface used.

The seat preferably is a center seat. This means that the seat may be arranged between a driver's seat and a front passenger's seat of a utility vehicle. The seat is in particular provided in a cab of the utility vehicle. The seat base may also be referred to as seat basis. The seat base preferably comprises a cuboid or box-shaped geometry and may be a component made from steel plates.

Preferably, the seat base comprises a front wall or front, a rear wall or rear arranged spaced apart from the front and parallel to the front, two side walls or sides arranged spaced apart from each other and parallel to each other, a top, and a bottom. The top and the bottom may be open or closed. Preferably, the sides are provided with seat base flanges facing the rear and extending past the top. Preferably, the seat element is mounted to the seat base flanges by means of the first pivoting mechanism. Accordingly, the backrest also is mounted to the seat base flanges by means of the second pivoting mechanism. The seat base flanges are provided in the area of the rear of the seat base.

The sitting surface and the first stepping surface of the seat element are preferably provided on opposite sides of the seat element. In particular, the sitting surface is provided on the front of the seat element, and the first stepping surface is provided on the back of the seat element. The sitting surface may be made of fabric, synthetic leather, or the like. The sitting surface may, for example, have padding, in particular in form of a foam padding. The sitting surface may thus also be referred to as seat cushion. Alternatively, the sitting surface may also be designed without such padding. For example, the sitting surface may be a seat shell in this case, made of, for example, wood or a composite material such as a fiber-reinforced plastic material.

The first stepping surface is preferably made from a steel sheet or an aluminum sheet. The first stepping surface may also be referred to as bottom stepping surface, first stepping plate, bottom stepping plate, first step or bottom step. Alternatively to a metal material, the first stepping surface may also be made of a composite material such as a fiber-reinforced plastic material or the like. The first stepping surface is designed to be non-slip, slip-proof or slip-resistant. To this end, the first stepping surface may have surface texturing. For example, the first stepping surface may be a diamond plate.

In the seat position of the seat element, the first stepping surface is facing the seat base, in particular its top, and the sitting surface is facing away from the seat base, in particular its top. The seat position of the seat element may also be referred to as first seat position or seat element seat position. In the first step position of the seat element, the first stepping surface is facing away from the seat base, and the sitting surface is facing the seat base. The seat element may rest on the top of the seat base. Alternatively, there may also be provided a supporting element between the top of the seat base and the seat element on which the seat element may rest both in the seat position and the first step position. The supporting element may be in the form of a strip. The supporting element may thus also be referred to as supporting strip. There may also be provided two supporting elements. In this case, one supporting element may be associated with each side of the seat base.

The second stepping surface is preferably made from a steel sheet or an aluminum sheet. The second stepping surface may also be referred to as top stepping surface, second stepping plate, top stepping plate, second step or top step. For example, the second stepping surface may be a diamond plate. Alternatively, the second stepping surface, like the first stepping surface, may also be made of a composite material, in particular of a fiber-reinforced plastic material or the like. The second stepping surface is also designed to be non-slip, slip-proof or slip-resistant. This means, the second stepping surface may also have a surface texturing.

The backrest sitting surface and the second stepping surface of the backrest are preferably provided on opposite sides of the backrest. In particular, the backrest sitting surface is provided on the front of the backrest, and the second stepping surface is provided on the back of the backrest. The backrest sitting surface may be made of fabric, synthetic leather, or the like. The backrest sitting surface, like the sitting surface, may have padding, in particular a foam padding. The backrest sitting surface may thus also be referred to as backrest cushion. Alternatively, the backrest sitting surface may also be designed without such padding. For example, the backrest sitting surface may be a backrest seat shell in this case, made of, for example, wood or a composite material such as a fiber-reinforced plastic material. The sitting surface and the backrest sitting surface are preferably ergonomically fitted to the user. This means, the sitting surface and the backrest sitting surface may be arbitrarily shaped, for example in the form of a free-form surface.

The seat position of the backrest may also be referred to as second seat position or backrest seat position. The backrest sitting surface being positioned "upright" relative to the seat base in the seat position means that the back rest or backrest sitting surface, is oriented approximately perpendicular to the seat base or it's top. However, in its seat position, the backrest is preferably slightly inclined backwards relative to the sitting surface. For example, the second stepping surface may be oriented in a defined inclination angle to the first stepping surface or to the top of the seat base, when the backrest is in its seat position. In this case, the seat element is preferably also in its seat position so that the first stepping surface is facing the seat base. The inclination angle may be referred to as the backrest inclination angle. This inclination angle is preferably 90° to 110°, more preferably 100°±5°, more preferably 100°±3°, more preferably 100°±1°, more preferably exactly 100°. The inclination angle α may be adjustable.

The first stepping surface and the second stepping surface are preferably parallel to each other and arranged spaced apart from each other in a height direction of the seat when the seat element is in the first step position and the backrest is in the second step position. However, "parallel" here also means that the first stepping surface and the second stepping surface may also be arranged slightly inclined to each other. For example, the first stepping surface and the second stepping surface may be inclined to each other at an inclination angle of 1° to 20°.

In particular, the first stepping surface and the second stepping surface each span one plane, particularly a first plane associated with the first stepping surface and a second plane associated with the second stepping surface. These two planes, which may also be referred to as planes of main extension of the stepping surfaces, are oriented parallel to each other when both the seat element and the backrest are in the respective step position, as explained above. If both the seat element and the backrest are in the respective seat position, the planes at the inclination angle described above are inclined relative to each other. This means, in this case the planes intersect.

The second pivoting mechanism is preferably configured to pivot the backrest as a whole. In particular, the backrest is flipped forward or folded forward when said backrest is pivoted from its seat position into the second step position. The term "forward" here means in the direction toward the seat element or the seat base. The backrest is preferably pivoted or flipped by the inclination angle mentioned above when the same is pivoted from its seat position into the second step position.

According to an embodiment, the first pivoting mechanism comprises a first axis of rotation, about which the seat element is rotatably mounted, and a second axis of rotation about which the seat element is rotatably mounted, the first axis of rotation being oriented perpendicular to the second axis of rotation.

The term "perpendicular" here means an angle of preferably 90°±10°, more preferably of 90°±5°, more preferably of 90°±1°, more preferably of exactly 90°. The first pivoting mechanism may also be referred to as swiveling mechanism or pivoting and rotating mechanism. Preferably, multiple mounting locations are provided on the sides or on the seat base flanges of the seat base. The first axis of rotation is associated with a first shaft of the first pivoting mechanism, which is rotatably mounted at the respective mounting locations of the seat base. For this, roller bearings or plain bearings may be provided. Alternatively, the first shaft may also be mounted rotationally fixed at the mounting locations and the seat element is accordingly mounted as to be rotatable about the shaft. The second axis of rotation is preferably associated with a second shaft of the first pivoting mechanism. This means that the first shaft is oriented perpendicular to the second shaft. The first shaft is preferably designed rotationally symmetric to the first axis of rotation, and the second shaft is preferably designed rotationally symmetric to the second axis of rotation.

According to another embodiment, the first axis of rotation intersects the second axis of rotation.

This means that the first axis of rotation and the second axis of rotation span a common plane. The first axis of rotation is preferably oriented parallel to a width direction of the seat, and the second axis of rotation is preferably oriented parallel to a depth direction of the seat.

According to another embodiment, the seat element is first pivotable about the first axis of rotation by a first pivot angle by means of the first pivoting mechanism for pivoting said seat element from the seat position into the first step position, wherein, after the pivoting about the first axis of rotation, the seat element is pivotable about the second axis of rotation by a second pivot angle.

This means that for pivoting the seat element from the seat position into the first step position, the seat element is pivoted in two steps first about the first axis of rotation and subsequently about the second axis of rotation. This means that the seat element is first lifted off the seat base and pivoted about the first axis of rotation. Subsequently, the seat element pivoted by the first pivot angle is now also pivoted by the second pivot angle about the second axis of rotation. Subsequently, the seat element is pivoted back about the first axis of rotation and placed on the seat base. When doing so, the seat element may be locked or latched with the seat base both in the seat position and the first step position. A locking mechanism may be provided for this.

According to another embodiment, the second pivot angle is larger than the first pivot angle.

The second pivot angle is preferably 180°. The first pivot angle may be, for example, 30° to 60°, preferably 45°. This means that the seat element is turned 180° about the second axis of rotation during the pivoting so that either the sitting surface or the first stepping surface is facing the seat base.

According to another embodiment, the seat element is mounted at a rear of the seat base as to be rotatable about the first axis of rotation.

In particular, the seat element is mounted about the first axis of rotation in the area of the rear. Preferably, the seat base flanges are provided at the rear of the seat base, said seat base flanges being connected to the sides of the seat base or formed integrally with the sides. The seat element is thus mounted on the seat base as to be rotatable about the first axis of rotation by means of the first shaft mentioned above, which is mounted on the rear of the seat base, in particular on the seat base flanges.

According to another embodiment, the first pivoting mechanism comprises a coupling element mounted on the seat base as to be rotatable about the first axis of rotation, wherein the seat element is mounted on the coupling element as to be rotatable about the second axis of rotation.

The above mentioned first shaft of the pivoting mechanism is preferably accommodated in the coupling element. For this, the first shaft may either be rotatably mounted in or on the coupling element or the first shaft is connected rotationally fixed with the coupling element and rotatably mounted on the seat base or on the seat base flanges, by means of the above-mentioned mounting locations. For mounting the seat element on the coupling element, the above mentioned second shaft is provided in the first pivoting mechanism. The second shaft may be rotatably mounted in or on the coupling element or rotatably mounted in or on the seat element. For this, roller bearings or plain bearings may be provided.

According to another embodiment, the seat element is linearly displaceable along the second axis of rotation for moving the seat element from a non-displaced position into a displaced position and vice versa.

The non-displaced position may also be referred to as pushed-in position and the displaced position as pulled-out position. In particular, the seat element is linearly displaceable along the second shaft. A linear motion guide may be provided for this. Because the seat element is movable from the non-displaced position into the displaced position, the seat element is able to be moved away from the seat base for pivoting about the second axis of rotation. Thereby a bumping of the seat element against the seat base or the backrest when said seat element is pivoted about the second axis of rotation is reliably prevented.

According to another embodiment, the seat element is spring-biased toward the non-displaced position.

Thereby the seat element automatically moves back into the non-displaced position when a force directed into the displaced position is no longer applied to said seat element. This simplifies the operation of the seat. In particular, it enables one-handed operation of the seat.

According to another embodiment, the first pivoting mechanism for moving the seat element from the non-displaced position into the displaced position and vice versa comprises a telescopic shaft assembly comprising a shaft and a spring element.

The telescopic shaft assembly forms the above-mentioned linear motion guide of the seat element. The shaft of the telescopic shaft assembly corresponds to the above-mentioned second shaft of the first pivoting mechanism. The spring element is preferably a cylinder spring, in particular a helical spring, or a gas pressure spring. The spring element is preferably a compression spring which spring-biases the seat element toward the non-displaced position. The spring element may be accommodated in the seat element or in the above-mentioned coupling element. Preferably, the shaft is arranged within the spring element. This way, a particularly compact structure of the telescopic shaft assembly can be achieved. The telescopic shaft assembly may further have a tubular shaft or sleeve arranged in the seat element. The sleeve, in turn, accommodates in particular the spring element and the second shaft.

According to another embodiment, the second pivoting mechanism comprises a third axis of rotation, about which the backrest is rotatably mounted, wherein the third axis of rotation is oriented parallel to the first axis of rotation and perpendicular to the second axis of rotation.

Preferably, the third axis of rotation is spaced apart from the first axis of rotation in the height direction and the depth direction of the seat and arranged parallel to said first axis of rotation. The third axis of rotation is optionally associated with a third shaft which is mounted on the seat base or the seat base flanges of the seat base by means of the above-mentioned mounting locations. The third shaft may be rotatably mounted on the seat base and connected rotationally fixed to the backrest, or the third shaft may be connected rotationally fixed to the seat base, and the backrest is mounted as to be rotatable about the third shaft. For this, roller bearings or plain bearings may be provided.

According to another embodiment, the seat comprises a locking means for locking the backrest both in the seat position as well as in the second step position.

The locking means is configured to positively lock the backrest. A positive connection is created by interlocking or engaging behind at least two connecting partners. The locking means preferably comprises the mounting locations in the form of borings provided on the seat base or the seat base flanges, as well as at least one locking member provided on the backrest. Preferably, two locking members are provided, which are positioned on opposing sides of the backrest. The locking members may, for example, be spring-biased pins, in particular so-called ball locking pins. On the other hand, such locking members, which are configured to snap into or engage with corresponding recesses in the backrest, may also be provided on the seat base flanges, in particular at the mounting locations. To move the backrest from its seat position into the second step position, the locking means is unlocked and the backrest is pivoted about the third axis of rotation. As soon as the backrest is in the second step position, the locking means automatically locks the backrest. Vice versa, the locking means again automatically locks the backrest also when said backrest is pivoted from the second step position into the seat position.

According to another embodiment, the backrest comprises a supporting bracket resting on the seat base or on the first stepping surface in the second step position.

This allows the second stepping surface to be subjected to a particularly high weight force. The supporting bracket is optional. The supporting bracket is preferably mounted on the back of the backrest, i.e., on the second stepping surface, as to be rotatable about a fourth axis of rotation.

According to another embodiment, the seat element comprises support portions resting on the seat base in the first step position.

This prevents the sitting surface from resting directly on the seat base in the first step position. This allows for a particularly secure footing to be achieved when the seat element is in the first step position, since a deforming of the potentially padded sitting surface is prevented. Preferably, the support portions are resting on the above-mentioned supporting element.

Further proposed is a utility vehicle, in particular a military utility vehicle, having at least one such seat.

The utility vehicle may also have multiple such seats. As mentioned above, the utility vehicle comprises a cab in which the seat is arranged. The seat is preferably a center seat arranged between the driver's seat and the front passenger's seat. The utility vehicle preferably comprises a weapon mounted on or to the roof of the cab operable via a roof hatch provided in the roof. The cab may be protected. This means that the cab may be protected against small arms fire, booby traps, improvised explosive devises (IED), mines, and the like. The seat is preferably mounted on a floor of the cab. Alternatively, the seat may also be suspended from the roof of the cab. The utility vehicle is preferably a wheeled vehicle. The utility vehicle preferably comprises all-wheel drive. The utility vehicle may be a truck used in the military applications.

Other possible implementations of the seat and/or the utility vehicle also comprise combinations of features or embodiments that are not explicitly mentioned above or described below in the context of the exemplary embodiments. The person skilled in the art will also add individual aspects as improvements or additions to the respective basic form of the seat and/or the utility vehicle.

BRIEF DESCRIPTION OF THE DRAWINGS

Further advantageous designs and aspects of the seat and/or utility vehicle are subject of the dependent claims as well as the exemplary embodiments of the seat and/or utility vehicle described below. Furthermore, the seat and/or the utility vehicle are explained in more detail on the basis of preferred embodiments with reference to the enclosed figures.

DETAILED DESCRIPTION

In the figures, identical or functionally identical elements have been provided with the same reference numbers, unless otherwise indicated. Concealed components are shown in the figures with dashed lines.

Figure 1:
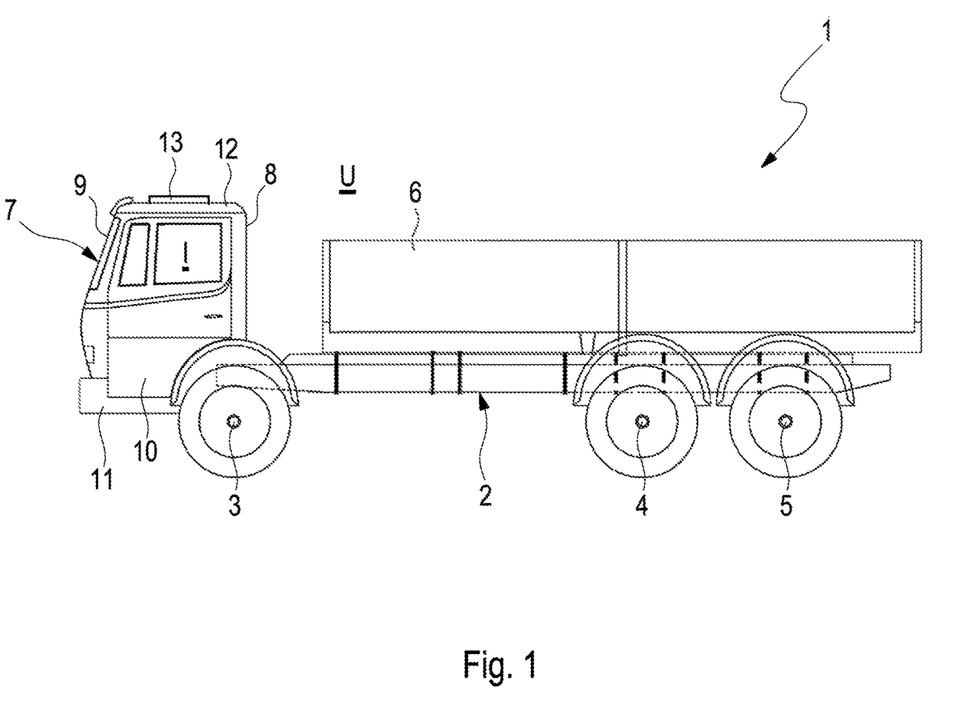
FIG. 1 shows a schematic view of an embodiment of a utility vehicle.

FIG. 1 shows a schematic side view of an embodiment of a utility vehicle 1. The utility vehicle 1 is in particular a military utility vehicle. The utility vehicle 1 may be a truck, as shown in FIG. 1. The utility vehicle 1 is in particular an all-terrain truck. The utility vehicle 1 may be a protected vehicle. The utility vehicle 1 comprises a chassis 2 having a plurality of axles 3 to 5. For example, three such axles 3 to 5 may be provided. This means that the utility vehicle 1 is a three-axle vehicle. The utility vehicle 1 preferably comprises all-wheel drive. This means that all axles 3 to 5 are driven. Alternatively, the utility vehicle 1 may also have any number of axles 3 to 5. The utility vehicle 1 may be a wheeled vehicle, as shown in FIG. 1. Alternatively, the utility vehicle 1 may also be a tracked vehicle.

The utility vehicle 1 further comprises a structure 6 supported by the chassis 2. The structure 6 may, for example, comprise a platform, a container, a case, a tank, or the like. The utility vehicle 1 further comprises a cab 7. The cab 7 is preferably protected against small arms fire, booby traps, improvised explosive devises (IED), mines, and the like. The cab 7 comprises a rear side 8 facing the structure 6, a front side 9 facing away from the structure 6, two doors 10 arranged laterally, a floor 11, and a roof 12.

A weapon (not shown) may be mounted on or to the roof 12. The roof 12 is provided with a roof hatch 13. The roof hatch 13 is openable and closable. For this, the roof hatch 13 is, for example, pivotable by means of a pivot mechanism. An interior I of the cab 7 may be entered and exited from a surrounding area U of the utility vehicle 1 via the opened roof hatch 13. In particular, the roof hatch 13 may be opened when the weapon mounted on or to the roof 12 is to be operated.

Figure 2:
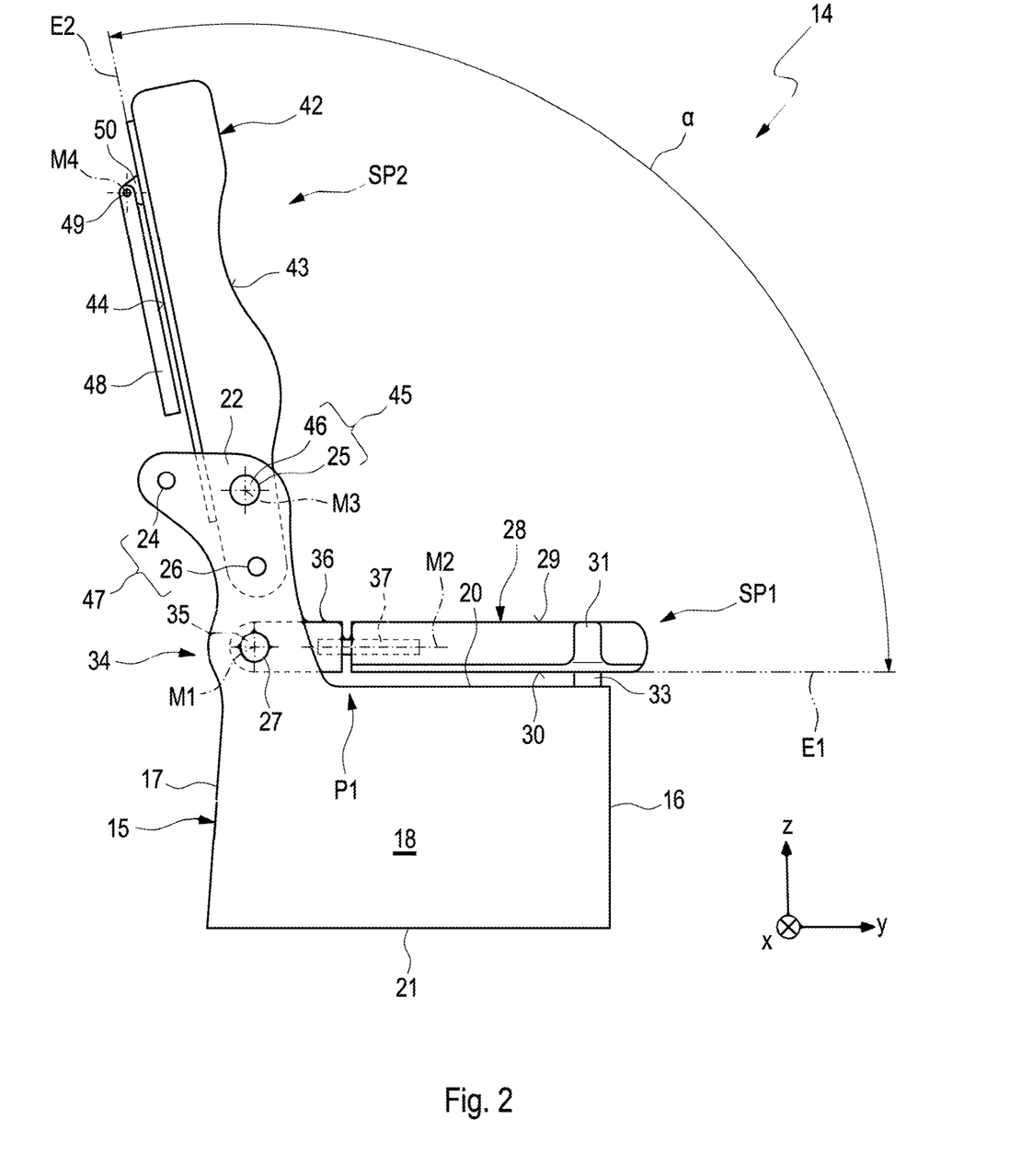
FIG. 2 shows a side view of an embodiment of a seat for the utility vehicle of FIG. 1.
Figure 3:
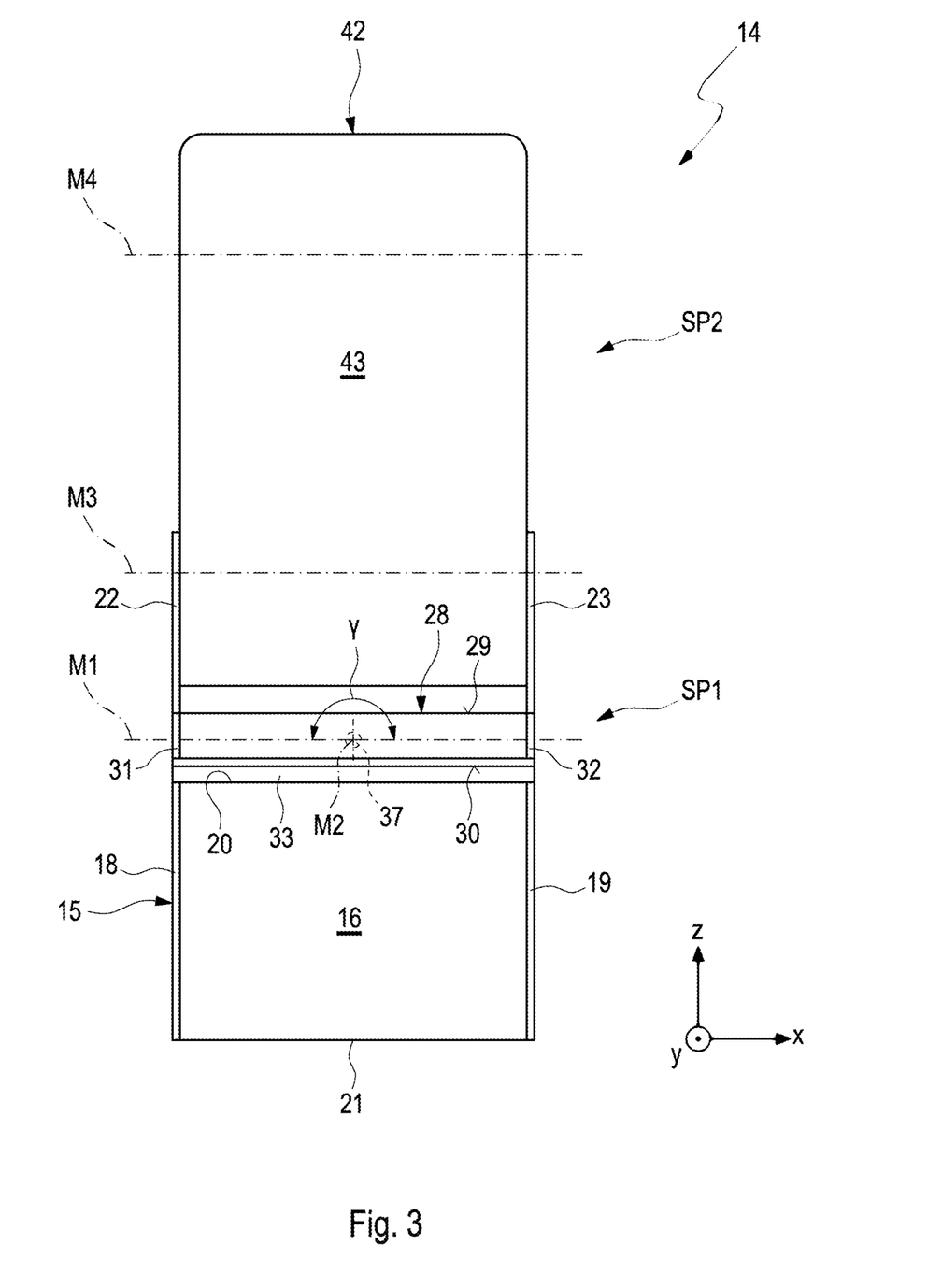
FIG. 3 shows a front view of the seat of FIG. 2.

FIG. 2 shows a schematic side view, and FIG. 3 shows a schematic front view of an embodiment of a seat 14 for the utility vehicle 1. The seat 14 is preferably arranged within the cab 7 and centered in the same. This means, the seat 14 is arranged below the roof hatch 13. The seat 14 may be arranged between a driver's seat and a front passenger's seat of the utility vehicle 1. The seat 14 may also be referred to as center seat. The seat 14 may be mounted to the floor 11 of the cab 7. Alternatively, the seat 14 may also be suspended from the roof 12 of the cab 7.

The seat 14 comprises a seat basis or seat base 15, which, as mentioned above, may be coupled with the floor 11 or the roof 12 of the cab 7. The seat base 15 comprises a front wall or front 16, and a rear wall or rear 17 arranged spaced apart from the front 16 and parallel to the front 16. The seat base 15 further comprises two side walls or sides 18, 19 arranged parallel to each other and spaced apart from each other. The seat base 15 further comprises a top 20 and a bottom 21 arranged parallel to the top 20 and spaced apart from the same. Thus, the seat base 15 is essentially cuboid or box-shaped. The seat base 15 may be upwardly open or closed, i.e., at the top 20. The bottom 21 may also be open or closed.

The seat base 15 further comprises two seat base flanges 22, 23 provided at the rear 17 and extending past the top 20. The seat base flanges 22, 23 may be formed monolithically, in particular, integrally, with the sides 18, 19. The term "monolithically" here means that the seat base flanges 22, 23 and the respective side 18, 19 form a common one-piece structural part, respectively. The term "integrally" here means that the seat base flanges 22, 23 and the respective side 18, 19 are made from the same material throughout, respectively.

For example, the sides 18, 19 with the respective seat base flange 22, 23 may be formed as steel plates. The entire seat base 15 may be a welded structure. Each seat base flange 22, 23 comprises multiple mounting locations 24 to 27. The mounting locations 24 to 27 may, for example, be provided as through holes in the respective seat base flange 22, 23. The mounting locations 24 to 27 may, in particular, be circular borings provided in the seat base flanges 22, 23. The mounting locations 24 to 27 may comprise roller bearings or plain bearings.

The seat 14 further comprises a seat element 28. The seat element 28 comprises a sitting surface 29 at its front and a first stepping surface 30 at its rear, i.e., facing away from the sitting surface 29. The first stepping surface 30 may also be referred to as bottom stepping surface. Moreover, the first stepping surface 30 may also be referred to as first stepping plate, bottom stepping plate, first step or bottom step. The sitting surface 29 may be a seat cushion or may be referred to as such. The sitting surface 29 may be made of fabric, synthetic leather, or the like. The sitting surface 29 may, for example, be padded by means of a foam material. The sitting surface 29 may also be designed without such padding. For example, the sitting surface 29 may be a seat shell in this case, made of, for example, wood or a composite material such as a fiber-reinforced plastic material.

The first stepping surface 30 may, for example, be made from a steel sheet or from an aluminum sheet. The first stepping surface 30 is non-slip or slip-proof. For example, the first stepping surface 30 may be a textured steel sheet or a textured aluminum sheet. In particular, the first stepping surface 30 may be a diamond plate. Alternatively, the first stepping surface 30 may also be made of a plastic material or a composite material such as a fiber-reinforced plastic material. The first stepping surface 30 may have surface texturing in this case, as well. The first stepping surface 30 spans a first plane E1. The first plane E1 may also be referred to as plane of main extension of the first stepping surface 30.

The first stepping surface 30 further comprises two support portions 31, 32, which, for example, may be formed as profile edges provided on the first stepping surface 30, and extending laterally along the sitting surface 29. The support portions 31, 32 are configured to rest on the top 20 of the seat base 15 or on a supporting element 33 provided on the top 20. The supporting element 33 may be in the form of a strip. The supporting element 33 may thus also be referred to as supporting strip. The supporting element 33 may extend between the sides 18, 19 and, for example, be welded to them. The supporting element 33 is optional. Alternatively, there may also be provided two supporting elements 33. In this case, one supporting element 33 may be associated with each side 18, 19 of the seat base 15.

The seat 14 further comprises a first pivoting mechanism 34 (FIG. 4) for pivoting the seat element 28. The first pivoting mechanism 34 may also be referred to as first pivoting mechanism or pivoting and rotating mechanism. The first pivoting mechanism 34 comprises a first shaft 35 mounted on the seat base 15 in the mounting locations 27 of the seat base flanges 22, 23 as to be rotatable about a first axis of rotation M1. The first pivoting mechanism 34 further comprises a coupling element 36 coupling the seat element 28 with the first shaft 35. The coupling element 36 extends strip-like between the sides 18, 19 or between the seat base flange 22, 23.

Figure 4:
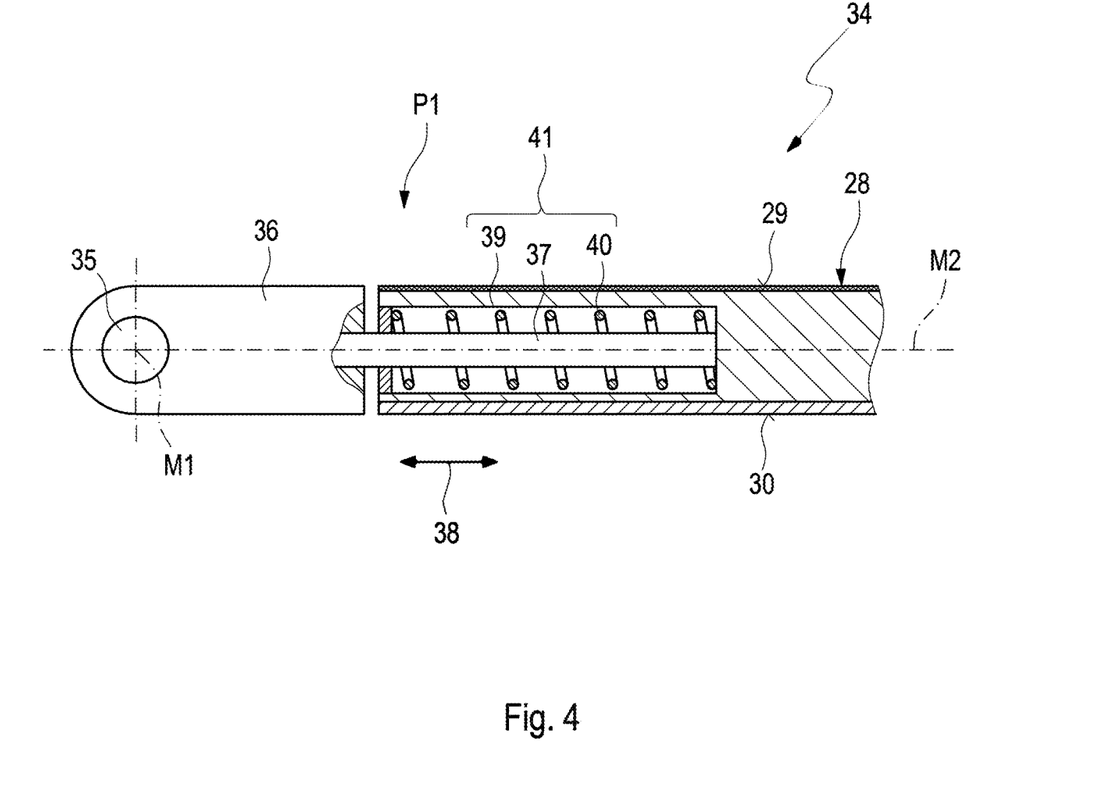
FIG. 4 shows a schematic view of an embodiment of a pivoting mechanism for the seat of FIG. 2.

The first shaft 35 may be rotatably mounted in the mounting locations 27 of the seat base flanges 22, 23. In this case, the mounting locations 27 may, for example, comprise roller bearings or plain bearings. Alternatively, the first shaft 35 may be mounted rotationally fixed at the mounting locations 27, and the coupling element 36 may rotate about the shaft 35 by rotating about the first axis of rotation M1. In this case, the first shaft 35 may be mounted in the coupling element 36 in roller bearings or plain bearings.

The first pivoting mechanism 34 further comprises a second shaft 37 mounted in the coupling element 36, about which the seat element 28 is mounted as to be rotatable about a second axis of rotation M2. The second shaft 37 may either be rotatably mounted in the seat element 28, or the second shaft 37 is rotatably mounted in the coupling element 36. For this, roller bearings or plain bearings may be provided. The first axis of rotation M1 and the second axis of rotation M2, or the first shaft 35 and the second shaft 37, are positioned perpendicular to each other. The term "perpendicular" here means an angle of preferably 90°±10°, more preferably of 90°±5°, more preferably of 90°±1°, more preferably of exactly 90°. The first axis of rotation M1 intersects the second axis of rotation M2.

The seat element 28 is linearly displaceable along the second axis of rotation M2 or along the second shaft 37. This linear displaceability is indicated in FIG. 4 with a double-headed arrow 38. The seat element 28 may be moved from a pushed-in or non-displaced position P1 shown in FIGS. 2 to 4, 6 and 7 into a pulled-out or displaced position P2 (FIG. 5) and vice versa. To move the seat element 28 from the non-displaced position P1 into the displaced position P2 and vice versa, either the seat element 28 may be moved linearly with respect to the second shaft 37, or the second shaft 37 is moved together with the seat element 28 linearly with respect to the coupling element 36. A linear motion guide may be provided for this.

In the exemplary embodiment of the first pivoting mechanism 34 according to FIG. 4, the seat element 28 is linearly displaceable with respect to the second shaft 37. For example, an optional tubular shaft or sleeve 39 may be provided in the seat element 28, in which the second shaft 37 is displaceably accommodated. The seat element 28 is spring-biased toward the non-displaced position P1. This means that the seat element 28 automatically moves from the displaced position P2 into the non-displaced position P1 and may be moved from the non-displaced position P1 into the displaced position P2 against the spring bias.

To this end, the first pivoting mechanism 34 comprises a spring element 40. The spring element 40 may either be arranged within the seat element 28, as shown in FIG. 4, or it may also be accommodated in the coupling element 36. The second shaft 37 and the spring element 40 form a telescopic shaft assembly 41 of the first pivoting mechanism 34. The optional sleeve 39 may also be part of the telescopic shaft assembly 41. The spring element 40 is preferably a cylinder spring, in particular a compression spring. The spring element 40 may also be a gas pressure spring. The second shaft 37 is accommodated in the spring element 40. The spring element 40, in turn, is accommodated in the sleeve 39.

The seat 14 further comprises a backrest 42 having a backrest sitting surface 43 and a second stepping surface 44 facing away from the backrest sitting surface 43. The second stepping surface 44 may also be referred to as top stepping surface. The second stepping surface 44 may also be referred to as second stepping plate, top stepping plate, second step or top step. The backrest sitting surface 43 may also be referred to as backrest cushion. The backrest sitting surface 43 may, for example, be made of fabric, synthetic leather, or the like. The backrest sitting surface 43 may, for example, be padded by means of a foam material. Alternatively, the backrest sitting surface 43 may also be designed without such padding. For example, the backrest sitting surface 43 may be a backrest seat shell in this case, made of, for example, wood or a composite material such as a fiber-reinforced plastic material.

The second stepping surface 44 may, for example, be made from a steel sheet or from an aluminum sheet. The second stepping surface 44 is non-slip or slip-proof. For example, the second stepping surface 44 may be a textured steel sheet or a textured aluminum sheet. In particular, the first stepping surface 44 may be a diamond plate. Alternatively, the second stepping surface 44 may also be made of a plastic material or a composite material such as a fiber-reinforced plastic material. The second stepping surface 44 may have surface texturing in this case, as well. The second stepping surface 44 spans a second plane E2. The second plane E2 may also be referred to as plane of main extension of the second stepping surface 44.

The backrest 42 is associated with a second pivoting mechanism 45 of the seat 14. The second pivoting mechanism 45 may also be referred to as second swiveling mechanism. The second pivoting mechanism 45 comprises the mounting locations 25 of the seat base flanges 22, 23 and a third shaft 46 mounted in the mounting locations 25. The third shaft 46 may be rotatably mounted in the mounting locations 25, or the third shaft 46 is accommodated rotationally fixed in the mounting locations 25, and the backrest 42 is rotatable about the third shaft 46. Correspondingly, roller bearings or plain bearings may also be provided.

In particular, the backrest 42 is pivotable about a third axis of rotation M3 by means of the second pivoting mechanism 45. The third axis of rotation M3 is preferably arranged parallel to the first axis of rotation M1 and positioned spaced apart from the same. This means that the third axis of rotation M3 is oriented perpendicular to the second axis of rotation M2. Viewed from a z-direction or height direction z of the seat 14, the third axis of rotation M3 is positioned above the axes of rotation M1, M2. The seat 14 is also assigned an x-direction or width direction x as well as a y-direction or depth direction y. The directions x, y, z are oriented perpendicular to each other a form a coordinate system of the seat 14. The axes of rotation M1, M3 are positioned parallel to the width direction x, and the second axis of rotation M2 is oriented parallel to the depth direction y.

The backrest 42 is further associated with a locking means 47. The locking means 47 comprises the mounting locations 24, 26 of the seat base flanges 22, 23 and a locking member (not shown). Preferably, two locking members are provided, which are positioned on opposing sides of the backrest 42. The locking members may be, for example, spring-biased pins, in particular so-called ball locking pins, provided on the backrest 42 which are configured to positively engage, in particular to snap in or interlock, either with the two mounting locations 24 or with the two mounting locations 26. In this case, the mounting locations 24, 26 may be recesses or borings. A positive connection is created by interlocking or engaging behind at least two connecting partners, in this case the locking members and the mounting locations 24, 26. Alternatively, the two mounting locations 24, 26 may be provided with such locking members that are configured to positively engage with corresponding recesses in the backrest 42.

The seat 14 further comprises a supporting bracket 48 attached to the stepping surface 44. The supporting bracket 48 is mounted on the second stepping surface 44 as to be rotatable about a fourth axis of rotation M4. At the back of the backrest 42, i.e., on the second stepping surface 44, a shaft 49 may be provided by the means of which the supporting bracket 48 is pivotable about the fourth axis of rotation M4. The shaft 49 may be pivotably mounted in a mounting section 50 provided at the second stepping surface 44. The fourth axis of rotation M4 is oriented parallel to the axes of rotation M1, M3.

The functionality of the seat 14 is explained below using FIGS. 2 to 7. As shown in FIGS. 2 and 3, the seat element 28 is in seat position SP1, in which the first stepping surface 30 is facing the seat base 15 and the sitting surface 29 is facing away from the seat base 15. The backrest 42 is also in a seat position SP2. In the seat position SP2 of the backrest 42, the backrest 42 or the backrest sitting surface 43 is positioned upright relative to the seat base 15. In particular, the backrest 42 is oriented approximately perpendicular relative to the seat base 15.

When the seat element 28 and the backrest 42 are in their seat positions SP1, SP2, then the second stepping surface 44 is inclined at an inclination angle α relative to the first stepping surface 30. The inclination angle is preferably 90° to 110°, more preferably 100°±5°, more preferably 100°±3°, more preferably 100°±1°, more preferably exactly 100°. The inclination angle α may be adjustable. As soon as the seat element 28 and the backrest 42 are in their seat positions SP1, SP2, the seat 14 may be used in the manner of a conventional seat. This means that a user is able to sit on the seat 14. When both the seat element 28 and the backrest 42 are in the respective seat position SP1, SP2, the planes E1, E2 are inclined relative to each other at the inclination angle α. This means that planes E1, E2 intersect at the inclination angle α.

Figure 5:
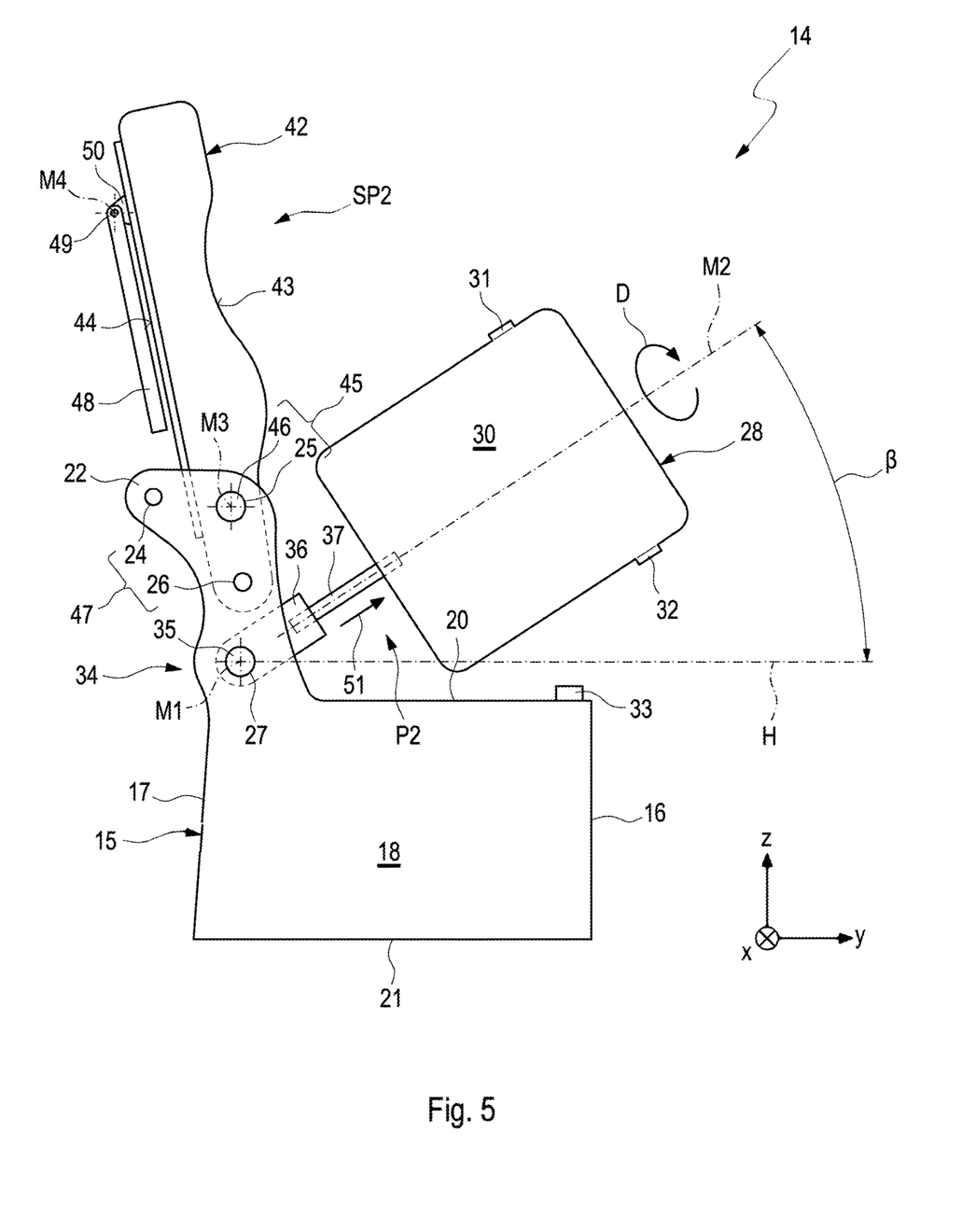
FIG. 5 shows another schematic side view of the seat of FIG. 2.
Figure 6:
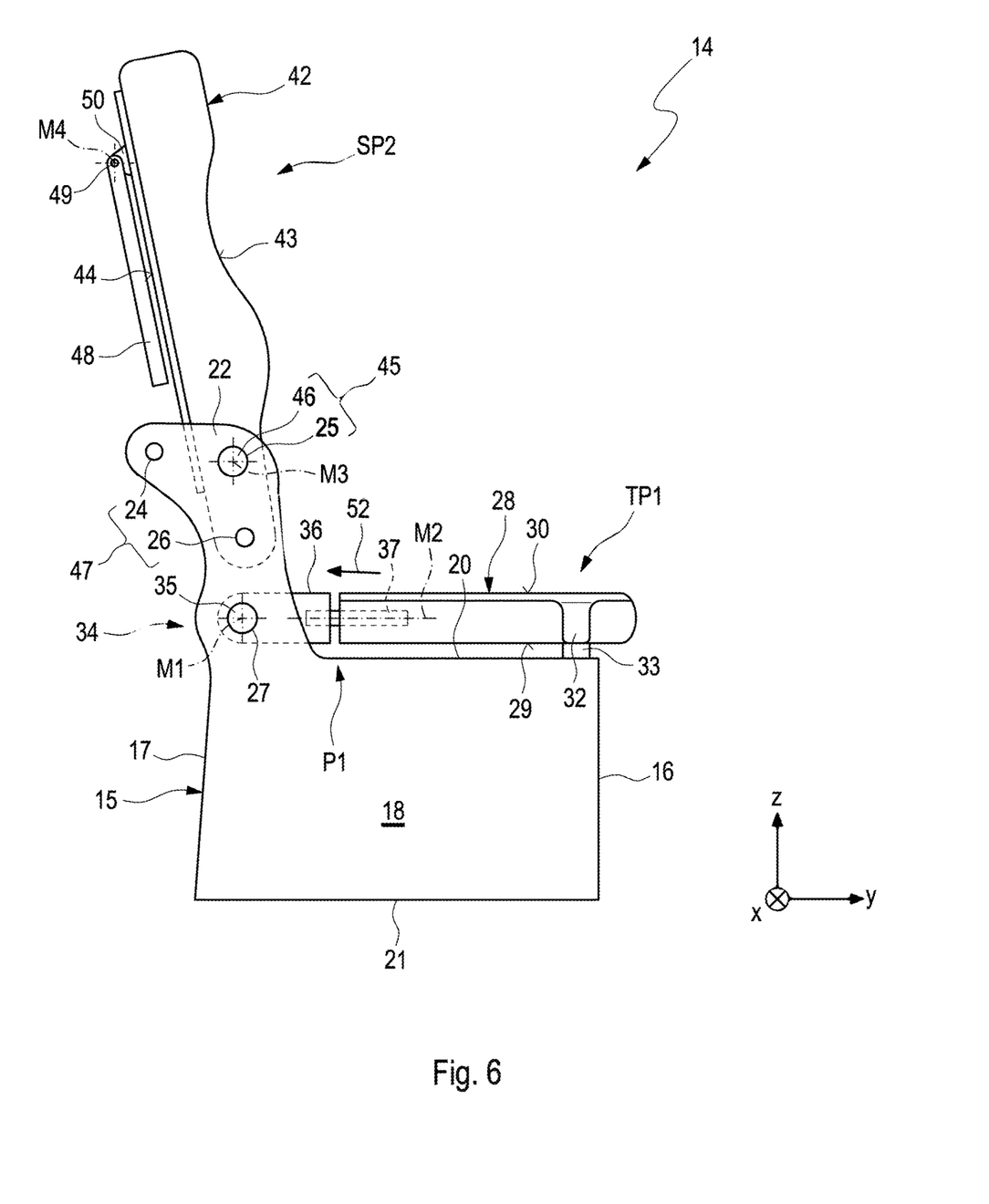
FIG. 6 shows another schematic side view of the seat of FIG. 2.
Figure 7:
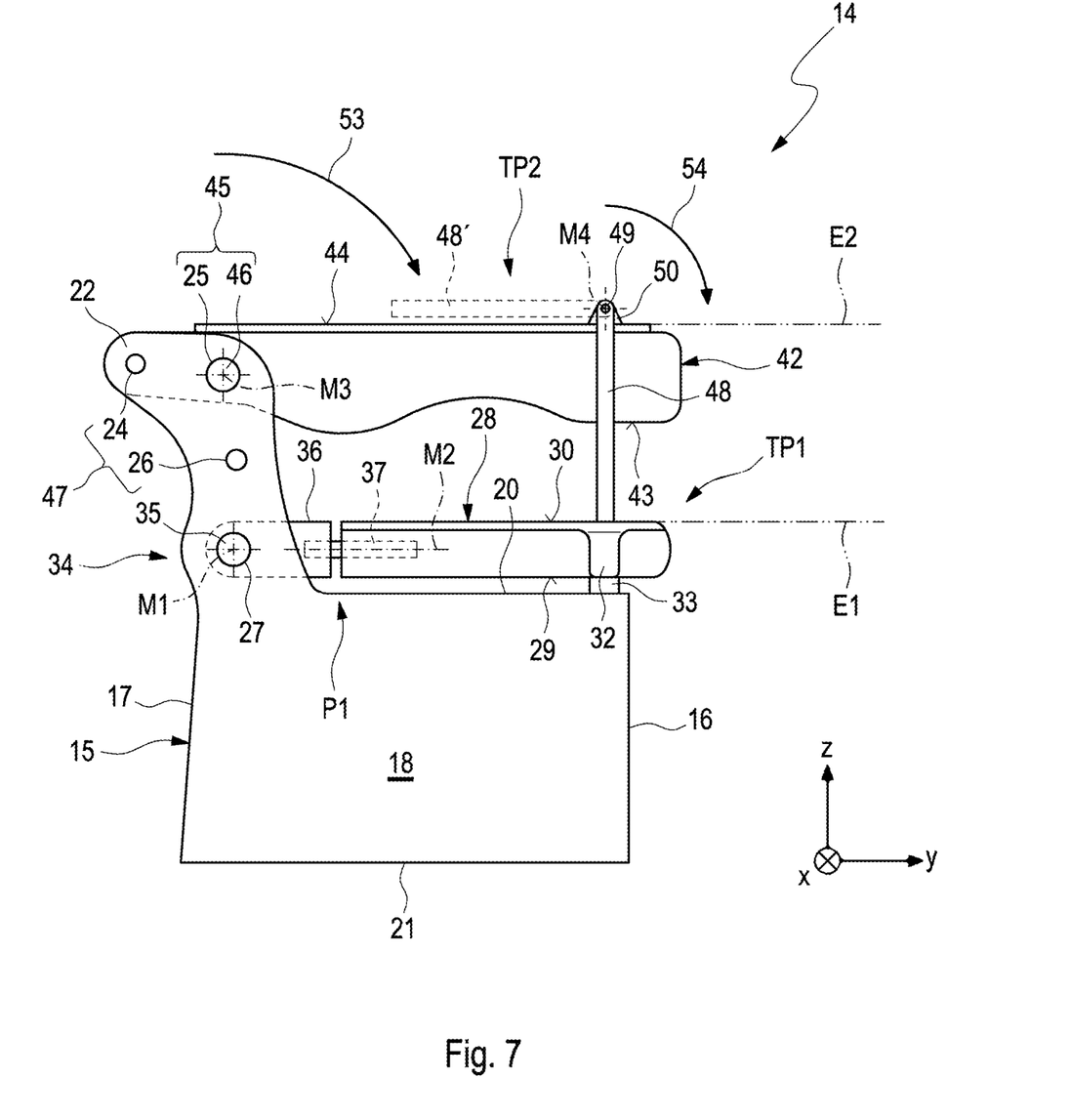
FIG. 7 shows another schematic side view of the seat of FIG. 2.

To move the seat element 28 from the seat position SP1 into a first step position TP1, shown in FIGS. 6 and 7, in which the first stepping surface 30 is facing away from the seat base 15, and the sitting surface 29 is facing the seat base 15, the seat element 28 is first lifted from the seat base 15, as shown in FIG. 5. In doing so, the seat element 28 is first pivoted about the first axis of rotation M1 by means of the first pivoting mechanism 34. A pivot angle β between the second axis of rotation M2 and a horizontal plane H may be approximately 45°. Prior to pivoting the seat element 28 about the first axis of rotation M1, the seat element 28 may be unlocked. For this, a locking means, for example in the form of a spring-biased pin may be provided.

After pivoting the seat element 28 about the first axis of rotation M1, the seat element 28 is linearly displaced along the second axis of rotation M2 against the spring bias of the spring element 40 to move the seat element 28 from the non-displaced position P1 shown in FIGS. 2 to 4, 6 and 7 into the displaced position P2 shown in FIG. 5. In the displaced position P2, the seat element 28 is arranged so far from the seat base 15 that the seat element 28 is pivotable about the second axis of rotation M2 by a pivot angle γ of 180° (FIG. 3). The first stepping surface 30 is now facing away from the seat base 15, and the sitting surface 29 is facing the seat base. This means that the seat element 28 is rotated by 180°. A direction of rotation D of the seat element 28 may be oriented clockwise, as shown in FIG. 5, but also counter-clockwise. The moving of the seat element 28 from the non-displaced position P1 into the displaced position P2 is indicated in FIG. 5 by means of an arrow 51.

Subsequently, as shown in FIG. 6, the seat element 28 is moved from the displaced position P2 into the non-displaced position P1 and pivoted back about the first axis of rotation M1 such that the support portions 31, 32 are resting on the seat base 15 or the supporting element 33. The moving of the seat element 28 from the displaced position P2 into the non-displaced position P1 is indicated in FIG. 6 by means of an arrow 52. As soon as the seat element is in the first step position TP1, the first stepping surface 30 may be stepped on by the user. The seat 14 may now be used as a standing platform such that the user is able to look out of the roof hatch 13 and is, for example, able to operate the weapon mounted on or to the roof 12.

To now move the backrest 42 from its seat position SP2 into a second step position TP2, shown in FIG. 7, in which the second stepping surface 44 is arranged parallel to the first stepping surface 30, the backrest 42 is first unlocked by means of the locking means 47 so that the backrest 42 is pivotable about the third axis of rotation M3 toward the seat element 28 by means of the pivoting mechanism 45. After unlocking the backrest 42, it is pivoted clockwise about the third axis of rotation M3. This pivoting movement is indicated in FIG. 7 an arrow 53. The backrest 42 is subsequently locked or latched again in the second step position TP2 by means of the locking means 47. The second stepping surface 44 may now also be used as a standing platform. The first stepping surface 30 may be operable as step-up to the second stepping surface 44. A clearance or space is now provided between the seat element 28 and the backrest 42. This means that the backrest 42 is not resting directly on the seat element 28.

The seat 14 may now be used as a two-step standing platform. The second stepping surface 44 is arranged parallel to the first stepping surface 30 and is spaced apart from the same in the height direction z. The term "parallel" may here also comprise that the stepping surfaces 30, 44 are slightly inclined toward each other, for example at an inclination angle of 1° to 20°. When both the seat element 28 and the backrest 42 are in the respective step position TP1, TP2, the planes E1, E2 are arranged parallel to each other and spaced apart from each other.

Additionally, the supporting bracket 48 is pivotable about the shaft 49 such that the supporting bracket 48 is resting either on the first stepping surface 30 or on the seat base 15 or the supporting element 33. This pivoting movement is indicated in FIG. 7 an arrow 54. This allows a higher weight to be placed on the second stepping surface 44. In FIG. 7, the supporting bracket 48 is assigned the reference number 48' in a folded-in position and the reference number 48 in a folded-out position.

It is also possible to only pivot the backrest 42 so that the seat element 28 is in its seat position SP1 and the backrest 42 is in the second step position TP2. In this case, only the second stepping surface 44 is operable as standing surface or standing platform.

Although the present invention has been described using examples, it can be modified in many ways.

LIST OF REFERENCE CHARACTERS

1 Utility vehicle
2 Chassis
3 Axle
4 Axle
5 Axle
6 Structure
7 Cab
8 Rear side
9 Front side
10 Door
11 Floor
12 Roof
13 Roof hatch
14 Seat
15 Seat base
16 Front
17 Rear
18 Side
19 Side
20 Top
21 Bottom
22 Seat base flange
23 Seat base flange
24 Mounting location
25 Mounting location
26 Mounting location
27 Mounting location
28 Seat element
29 Sitting surface
30 Stepping surface
31 Support portion
32 Support portion
33 Supporting element
34 Pivoting mechanism
35 Shaft
36 Coupling element
37 Shaft
38 Double-headed arrow
39 Sleeve
40 Spring element
41 Telescopic shaft assembly
42 Backrest
43 Backrest sitting surface
44 Stepping surface
45 Pivoting mechanism
46 Shaft
47 Locking means
48 Supporting bracket
48' Supporting bracket
49 Shaft
50 Mounting section
51 Arrow
52 Arrow
53 Arrow
54 Arrow
D Direction of rotation
E1 Plane
E2 Plane
H Horizontal plane
I Interior
M1 Axis of rotation
M2 Axis of rotation
M3 Axis of rotation
M4 Axis of rotation
P1 Position
P2 Position
SP1 Seat position
SP2 Seat position
TP1 Step position
TP2 Step position
U Surrounding area
x Width direction
y Depth direction
z Height direction
α Inclination angle
β Pivot angle
γ Pivot angle

The invention claimed is:

1. A seat for a utility vehicle, comprising:
a seat base,
a seat element comprising a sitting surface and a first stepping surface,
a first pivoting mechanism for pivoting the seat element such that the seat element is pivotable from a seat position, in which the first stepping surface is facing the seat base, into a first step position, in which the first stepping surface is facing away from the seat base,
a backrest comprising a backrest sitting surface and a second stepping surface, and
a second pivoting mechanism for pivoting the backrest such that the backrest is pivotable from a seat position, in which the backrest sitting surface is positioned upright relative to the seat base, into a second step position, in which the second stepping surface is arranged parallel to the first stepping surface.

2. The seat according to claim 1,
characterized in that,
the first pivoting mechanism comprises a first axis of rotation, about which the seat element is rotatably mounted, and a second axis of rotation, about which the seat element is rotatably mounted, the first axis of rotation being oriented perpendicular to the second axis of rotation.

3. The seat according to claim 2,
characterized in that,
the first axis of rotation intersects the second axis of rotation.

4. The seat according to claim 2,
characterized in that,
the seat element is first pivotable about the first axis of rotation by a first pivot angle by means of the first pivoting mechanism for pivoting said seat element from the seat position into the first step position, wherein, after the pivoting about the first axis of rotation, the seat element is pivotable about a second axis of rotation by a second pivot angle.

5. The seat according to claim 4,
characterized in that,
the second pivot angle is larger than the first pivot angle.

6. The seat according to claim 2,
characterized in that,
the seat element is mounted at a rear of the seat base as to be rotatable about the first axis of rotation.

7. The seat according to claim 2,
characterized in that,
the first pivoting mechanism comprises a coupling element mounted on the seat base as to be rotatable about the first axis of rotation, wherein the seat element is mounted on the coupling element as to be rotatable about the second axis of rotation.

8. The seat according to claim 2,
characterized in that,
the seat element is linearly displaceable along the second axis of rotation for moving the seat element from a non-displaced position into a displaced position and vice versa.

9. The seat according to claim 8,
characterized in that,
the seat element is spring-biased toward the non-displaced position.

10. The seat according to claim 8,
characterized in that,
the first pivoting mechanism for moving the seat element from the non-displaced position into the displaced position and vice versa comprises telescopic shaft assembly having a shaft and a spring element.

11. The seat according to claim 2,
characterized in that,
the second pivoting mechanism comprises a third axis of rotation, about which the backrest is rotatably mounted, wherein the third axis of rotation is oriented parallel to the first axis of rotation and perpendicular to the second axis of rotation.

12. The seat according to claim 1,
characterized by
a locking means for locking the backrest both in the seat position as well as in the second step position.

13. The seat according to claim 1,
characterized in that,
the backrest comprises a supporting bracket resting in the second step position on the seat base or on the first stepping surface.

14. The seat according to claim 1,
characterized in that,
the seat element comprises support portions resting in the first step position on the seat base.

15. A utility vehicle, comprising at least one seat according to claim 1.

16. The utility vehicle according to claim 15, characterized in that the utility vehicle is a military utility vehicle.

* * * * *